(12) United States Patent
Blackman et al.

(10) Patent No.: US 7,475,069 B2
(45) Date of Patent: Jan. 6, 2009

(54) SYSTEM AND METHOD FOR PRIORITIZING WEBSITES DURING A WEBCRAWLING PROCESS

(75) Inventors: David L. Blackman, Rego Park, NY (US); Michael Ching, San Jose, CA (US); Stephen Dill, San Jose, CA (US); Ivan Eduardo Gonzalez, Pittsburgh, PA (US); Adam Marcus, Stamford, CT (US); Daniel Norin Meredith, Sunnyvale, CA (US); Linda Anh Linh Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 11/392,856

(22) Filed: Mar. 29, 2006

(65) Prior Publication Data

US 2007/0239701 A1    Oct. 11, 2007

(51) Int. Cl.
*G06F 17/30* (2006.01)
(52) U.S. Cl. .................................. 707/5; 707/4; 707/6
(58) Field of Classification Search .................. 707/1, 707/2, 3, 4, 5, 6
See application file for complete search history.

(56) References Cited

U.S. PATENT DOCUMENTS

| | | | |
|---|---|---|---|
| 6,351,755 B1 * | 2/2002 | Najork et al. ............... 715/206 |
| 6,507,867 B1 * | 1/2003 | Holland et al. .............. 709/219 |
| 6,963,867 B2 * | 11/2005 | Ford et al. ..................... 707/3 |
| 7,194,454 B2 * | 3/2007 | Hansen et al. ................ 707/36 |
| 2001/0003828 A1 * | 6/2001 | Peterson et al. ............. 709/219 |
| 2002/0052928 A1 | 5/2002 | Stern et al. .................. 709/218 |
| 2002/0083132 A1 * | 6/2002 | Holland et al. .............. 709/203 |
| 2002/0173971 A1 * | 11/2002 | Stirpe et al. ..................... 705/1 |
| 2003/0069880 A1 * | 4/2003 | Harrison et al. ................ 707/3 |
| 2003/0208578 A1 * | 11/2003 | Taraborelli et al. .......... 709/223 |
| 2004/0230572 A1 * | 11/2004 | Omoigui ........................ 707/3 |
| 2004/0249801 A1 * | 12/2004 | Kapur ............................ 707/3 |
| 2005/0004889 A1 * | 1/2005 | Bailey et al. ................... 707/1 |
| 2005/0044280 A1 * | 2/2005 | Reisman ........................ 710/1 |
| 2005/0091340 A1 * | 4/2005 | Facemire et al. ............ 709/218 |
| 2005/0131894 A1 * | 6/2005 | Vuong ............................ 707/5 |
| 2005/0192936 A1 | 9/2005 | Meek et al. .................... 707/3 |
| 2005/0289140 A1 * | 12/2005 | Ford et al. ..................... 707/5 |

(Continued)

FOREIGN PATENT DOCUMENTS

EP    1 564 661 A2    8/2005

*Primary Examiner*—Pierre M. Vital
*Assistant Examiner*—Mohammad S Rostami
(74) *Attorney, Agent, or Firm*—Schmeiser, Olsen & Watts

(57) ABSTRACT

A system and method for prioritizing a fetch order of web pages. The method comprises extracting by a web crawler a set of candidate web pages to be crawled. Each web page in the set of candidate web pages is associated with a website in a computer network. A determination is made to determine if a first website score for the website is in a website score database. The first website score is associated with web pages in the set of candidate web pages if the first website score exists in the website score database. The set of candidate web pages is prioritized with respect to an associated website score for each web page in the candidate set of web pages. Content is retrieved from the set of candidate web. Hyperlinks are extracted from the content. The hyperlinks are stored in a memory unit.

7 Claims, 5 Drawing Sheets

U.S. PATENT DOCUMENTS

| | | | |
|---|---|---|---|
| 2006/0004691 A1* | 1/2006 | Sifry | 707/1 |
| 2006/0026147 A1* | 2/2006 | Cone et al. | 707/3 |
| 2006/0053097 A1* | 3/2006 | King et al. | 707/3 |
| 2007/0038600 A1* | 2/2007 | Guha | 707/3 |
| 2007/0112780 A1* | 5/2007 | Stone et al. | 707/10 |

* cited by examiner

SYSTEM AND METHOD FOR PRIORITIZING WEBSITES DURING A WEBCRAWLING PROCESS

BACKGROUND OF THE INVENTION

1. Technical Field

The present invention relates to a system and associated method for prioritizing websites and web pages during a web crawling process.

2. Related Art

Due to a plurality of factors, users of a network may find it necessary to streamline a search process to locate information on the network. Therefore there exists a need for an efficient method for streamlining a search process to locate and gather information on a network.

SUMMARY OF THE INVENTION

The present invention provides a prioritization method, comprising:

extracting, by a web crawler in a computing system, a set of candidate web pages to be crawled, wherein said computing system comprises a memory unit, and wherein said memory unit comprises said web crawler, said set of candidate web pages, an online analysis software application, an offline analysis software application, and a website score database;

associating, by said online analysis software application, each web page in said set of candidate web pages with a website in a computer network;

determining online, by said online analysis software application, if a first website score for said website, is in said website score database;

associating, by said online analysis software application, said first website score for said website with associated web pages in said set of candidate web pages, if said first website score exists in said website score database;

prioritizing, said set of candidate web pages with respect to an associated website score for each web page in said candidate set of web pages;

retrieving, by said web crawler, content from said set of candidate web pages using said prioritizing;

extracting, by said online analysis software application, hyperlinks from said content;

storing said hyperlinks in said memory unit.

The present invention provides a computing system comprising a processor coupled to a computer-readable memory unit, said memory unit comprising a web crawler, a set of candidate web pages, an online analysis software application, an offline analysis software application, a website score database, and instructions that when executed by the processor implement a prioritization method, said method comprising:

extracting, by said web crawler, said set of candidate web pages to be crawled;

associating, by said online analysis software application, each web page in said set of candidate web pages with a website in a computer network;

determining online, by said online analysis software application, if a first website score for said website, is in said website score database;

associating, by said online analysis software application, said first website score for said website with associated web pages in said set of candidate web pages, if said first website score exists in said website score database;

prioritizing, said set of candidate web pages with respect to an associated website score for each web page in said candidate set of web pages;

retrieving, by said web crawler, content from said set of candidate web pages using said prioritizing;

extracting, by said online analysis software application, hyperlinks from said content;

storing said hyperlinks in said memory unit.

The present invention provides computer program product, comprising a computer usable medium including an online analysis software application, an offline analysis software application, a website score database, a web crawler, a set of candidate web pages, and computer readable program code embodied therein, said computer readable program code comprising an algorithm adapted to implement a prioritization method within a computing system, said method comprising:

extracting, by said web crawler, said set of candidate web pages to be crawled;

associating, by said online analysis software application, each web page in said set of candidate web pages with a website in a computer network;

determining online, by said online analysis software application, if a first website score for said website, is in said website score database;

associating, by said online analysis software application, said first website score for said website with associated web pages in said set of candidate web pages, if said first website score exists in said website score database;

prioritizing, said set of candidate web pages with respect to an associated website score for each web page in said candidate set of web pages;

retrieving, by said web crawler, content from said set of candidate web pages using said prioritizing;

extracting, by said online analysis software application, hyperlinks from said content;

storing said hyperlinks in said memory unit.

The present invention advantageously provides a system and associated method for streamlining a search process to locate and gather information on a network.

DETAILED DESCRIPTION OF THE INVENTION

Figure 1:
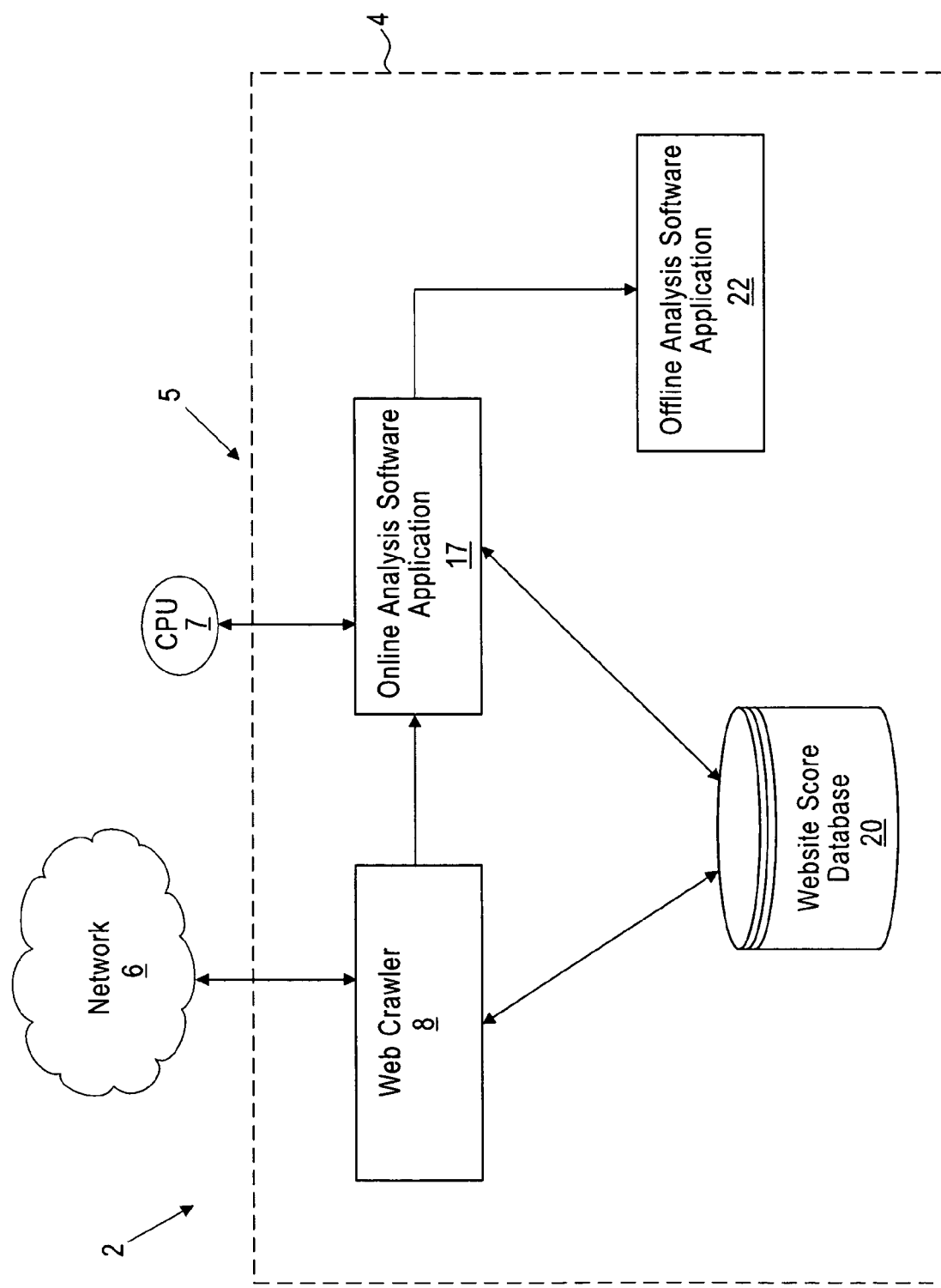
FIG. 1 illustrates a block diagram view of a web crawler system comprising a computing system connected to a computer network, in accordance with embodiments of the present invention.

FIG. 1 illustrates a block diagram view of a web crawler system 2 comprising a computing system 5 connected to a computer network 6, in accordance with embodiments of the present invention. The computer network 6 may comprise any type of computer network known to a person of ordinary skill in the art including, inter alia, the Internet. The World Wide Web (herein referred to as "the Web") is an information sharing model comprising a method for accessing information over the Internet. The computing system 5 comprises a web crawler 8. A web crawler (e.g., web crawler 8 in FIG. 1) is a software tool that searches the Web for content (i.e., web pages) and feeds the content to a search engine. A web page comprises a document on the Web. The Web comprises a nearly infinite amount of information and therefore a web crawler may not be able to scan the Web in its entirety or refresh all user-defined content in a timely manner. The Web comprises a vast amount of content of questionable merit (i.e., adult content, spam, etc.) so in an effort to conserve constrained resources like bandwidth, processing time, and storage, web crawlers must avoid such questionable content while directing efforts toward the discovery of higher value content and refreshing known good content. A web crawler maintains a list of universal resource locators (URL) which have been discovered, but not yet downloaded. The list of URLs (e.g., for a candidate set of web pages comprises a set of URLs to be crawled) is stored in an URL frontier (e.g., see URL database 8c in FIG. 2). Most web crawlers perform a web page level analysis to determine a priority of URLs in the URL frontier. Among these web page level analysis techniques are content-based and link-based analyses. In general, it is cost prohibitive to perform extensive analysis on each page encountered. Content-based analysis implicitly requires the content of a given URL to be downloaded. Link-based analysis generally must be executed using not only the content of the page in question, but also a set of pages which contain links relevant to each web page. The web crawler system 2 in FIG. 1 approaches the web as a collection of websites (i.e., a group of web pages), as opposed to individual web pages. A web page is ranked by the web crawler system 2 in terms of its source website's importance or utility. In order accomplish this, a website score is compiled via a sampling of web pages from that website (i.e., retrieving only some web pages in the website). The sampling of web pages may comprise any sampling process known to a person of ordinary skill in the art including, inter alia, random sampling, sampling every specified number of pages, etc. The process of compiling a website score is flexible and extensible to the needs of a user of the web crawler system 2 and is able to take into account a variety of web crawling concerns (e.g., adult content, spam, etc).

The computing system 5 comprises a central processing unit (CPU) 7 connected to a computer readable memory system 4. The computer readable memory system 4 comprises a web crawler 8, an online analysis tool 17, an offline analysis software application 22, and a website score database 20. The web crawler 8 performs a search for content (i.e., information) on the web (i.e., from websites). The web crawler 8 comprises a software tool that locates and retrieves content from the web in an automated and methodical manner. The web crawler 8 performs a web crawl of the Web. A web crawl of the Web comprises retrieving known web pages and extracting hyperlinks (i.e., URLs) to other web pages, thus increasing a data store of known and downloaded/downloadable documents. The web crawler 8 replicates content available on the web to a data storage system for indexing and further analysis. The web crawler 8 is typically initialized with a seed list of URLs (i.e., links to various web pages of user interest) based on a search criteria. As the web crawler 8 fetches a web page (i.e., an individual page of information that is a part of a website) associated with an URL, it extracts hyperlinks and adds them to the URL database 8c in FIG. 2. The web pages are typically scored (i.e., assigned a web page ranking score by the web crawler 8) in order of relevance based on a search criteria. Alternatively, the web pages may already comprise a web page ranking score. The online analysis software application 17 comprises software tools that interact with the web crawler 8 as new content is collected and analyzed. The web crawler 8 also interacts with online analysis software application 17 to retrieve any website scores previously assigned to a website in order to prioritize a download of web pages in the future. A website score comprises a score generated as a function of a plurality of web page scores. The offline analysis software application 22 comprises software tools that run in parallel to the online analysis software application 17 and the web crawler 8. If any websites currently lack a website score or have an outdated website score (i.e., a specified time period has elapsed since the website score has been generated), the offline analysis software application 22 collects a sample of web pages from that website (i.e., less than a total number of web pages in the website), runs resource intensive analyses on each sample web page that results in individual web page scores, and aggregates these scores into a single score for the website. The score (i.e., website score) is then stored in the website score database 20. The website score database 20 comprises a collection of websites, their website scores, and a last date of ranking (i.e., creating a website score). The website score database 20 is updated by the offline analysis software application 22 when a website is scored or rescored. Additionally, the website score database 20 is queried by the online analysis software application 17 when a website score is required for retrieval prioritization. The computing system 5 performs various analyses on a sample of web pages from a website to formulate a website score. Future web pages from the website may then be prioritized in relation to all web pages from other websites via a website score. By utilizing a website sample based approach to evaluate web pages, the task of ranking URLs within the frontier comprises a simplified process.

Figure 2:
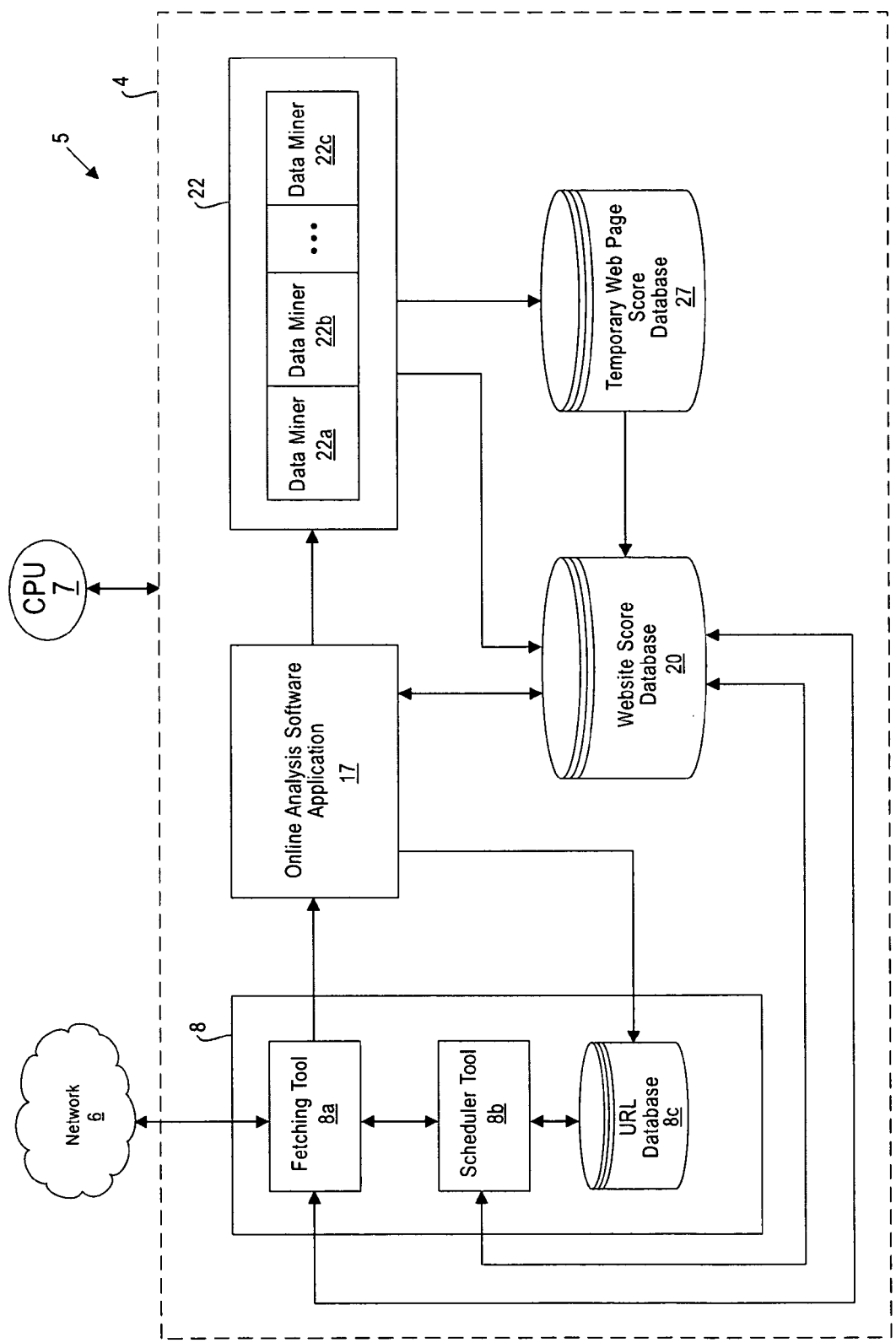
FIG. 2 illustrates a detailed block diagram view of the web crawler system of FIG. 1, in accordance with embodiments of the present invention.

FIG. 2 illustrates a detailed block diagram view of the web crawler system 2 of FIG. 1, in accordance with embodiments of the present invention. FIG. 2 illustrates the overall web crawler system 2 architecture and describes how the various components within the web crawler system 2 relate to each other. In order to prevent the website scoring process from slowing down the actual web crawling and fetching process, the architecture in FIG. 2 is divided into two stages: an online analysis stage (i.e., performed by the online analysis software application 17) and an offline analysis stage (i.e., performed by the offline analysis software application 22). The online analysis stage and the offline analysis stage may be performed simultaneously. The online analysis stage comprises the use of a scheduler tool 8b (within the web crawler 8) and the online analysis software application 17. The aforementioned components run in parallel with a fetching process (i.e., performed by the fetching tool 8a within the web crawler 8). The offline analysis software application 22 comprises a data miner chain (e.g., data miners 22a . . . 22c) which performs more extensive content analysis. The data miner chain may alternatively run on computing systems that are separate from the computing system 5. While the scheduler tool 8b and online analysis software application 17 are coupled in one multi-threaded process, the remaining components in the web crawler system 2 are distributed using a service oriented architecture. For each scored website, the website score database 20 stores the website score, as well as a date on which the website was scored. Website scores comprise integers between −1000 and 1000 inclusive. A website score −1000 refers to websites of the poorest quality (e.g., spam, adult content, content of little relevance to the search, etc.) with respect to a user. A website score 1000 refers to websites of the highest quality (e.g., content that is most relevant to the search) with respect to a user. A website score of 0 refers to websites which are roughly neutral in quality. Note that the website score range (i.e., −1000 to 1000) is arbitrary and that any other range of integers, real numbers, etc. may be used. The website score database 20 acts as a link between online and offline analysis stages. The online analysis stage queries for website scores and the offline analysis stage updates and/or generates the website scores. During a content search process, the web crawler 8 perpetually iterates over a list of all URLs (i.e., from a sampling of web pages comprised by a website) that have been discovered by a web crawling process. The list is pulled in batches and each URL (i.e., for a web page) in the batch is given a score. The batch is then sorted by the score and then sent to the fetcher tool 8a. The fetcher tool 8a is allocated a constrained time period in which as many of the URLs as possible should be fetched. The scheduler tool 8b manages an ordering of the URL database 8c by assigning scores to the URLs and incorporates the information from the website score database 20 in the URL ranking. This is accomplished by extracting the website from each URL and querying the website score database for a website score. If a website score does not exist, a slightly higher than neutral score is assigned, as unscored websites are favored for their potential for containing novel (relevant) content. All newly fetched web pages are routed to the online analysis software application 17 (as well as being written to a data store for later indexing and analysis). The online analysis software application 17 performs online heuristics on each web page to determine whether or not a web page should be sent to the offline analysis software application 22 for additional processing. As a first example of online heuristics, the online analysis software application 17 checks a hypertext transfer protocol (HTTP) response code for the web page to ensure that the request for the web page was successful. The online analysis software application 17 checks for empty or "soft" error pages. Soft error pages are those on which an error has occurred (e.g. HTTP 404 or 302 errors), while mistakenly returning a successful HTTP return code (e.g., HTTP 200). If an error is found, the web page is discarded. As a second example of online heuristics, the web page undergoes a basic analysis (i.e., by the online analysis software application 17) to verify that the web page actually contains data worth analyzing further. For example, a web page may not comprise any content. In this case, the web page is discarded. If the website has passed the aforementioned checks, the website score database 20 is queried. If a website score does not exist or if a sufficient period of time T has elapsed since a website score was produced, the web page is sent to the offline analysis software application 22 for further processing.

The offline analysis software application 22 comprises data miners 22a . . . 22c. When a web page is scheduled for offline analysis (i.e., by the online analysis software application 17), the web page is passed through the data miners 22a . . . 22c, each of which score the web page based on various offline heuristics.

Examples of offline heuristics are illustrated as follows:
1. Does the web page contain expressions (e.g., words or phrases) that are interesting to a user of the web crawler?
2. Does the web page link to websites that a user of the web crawler may be interested in?
3. Do the contents of the web page appear to be spam?
4. Do the contents of the web page appear to be adult content?
5. Is the language and top-level domain of the website interesting to a user of the web crawler?
6. Does the web page link to diverse and interesting media, such as PDF files?

The multiple web page scores for each of the web pages may be aggregated into a weighted average and the final web page score is stored temporarily in the temporary web page score database 27. Alternatively, multiple web page scores for each of the web pages may be combined in more complex ways as well. Once a threshold p of web pages for a website has been collected, the web page scores may be averaged (note that other analysis techniques may be performed) and submitted to the website score database 20. Threshold p may be variable between different websites. The web pages entries in the temporary web page score database 27 are removed at this point. A separate clean-up thread periodically ensures that websites that have not had web pages scored in a specified amount of time, perhaps because they have fewer than p pages, are scored after some time period t. This process prevents the web page score database 20 from becoming too large.

The data miners 22a . . . 22c within the offline analysis software application 22 may comprise any type of data miners known to a person of ordinary skill in the art. The following description describes various examples of data miners that may be used to implement the data miners 22a . . . 22c of FIG. 2. Data miners are typically divided into two types: cross-cutting content analysis data miners and consumer specific content analysis data miners. Cross-cutting content analysis data miners comprise data miners that are generic to any web crawl process that is biased by content quality. Consumer specific content analysis data miners comprise data miners that search the web based on the application of the content that is crawled, thus biasing the Web crawler 8 to focus on specific content desired by the Web crawler 8 user.

Examples of cross-cutting content data miners:

Adult content data miner—An adult content data miner identifies web pages containing adult content by way of a classifier. The web page score is then biased negatively for web pages comprising adult content.

Bad URL data miner—If an URL of a web page contains words that are considered indicative of poor content or if the hostname has a large number of segments, a bad URL data miner ranks the web page with a lower score.

Content type data miner—A content type data miner biases toward web pages that refer to content types that consumers (i.e., users) may find useful, such as, inter alia, .doc files, .PDF files, .ppt files, etc. Web pages that contain such file types are more likely to contain other HTML-based content which is valuable. Most web pages that contain links to these file types may be described as hubs of information which could potentially be perceived as valuable.

Spam data miner—A spam data miner identifies web pages containing spam. The spam data miner uses content analysis techniques similar to the adult content miner.

Examples of consumer specific content analysis data miners:

Blog data miner—A blog or web log is a website where the author of the website makes note of other interesting locations on the web and sometimes editorializes these locations. The blog data miner biases the web crawler 8 toward websites that are identified as containing blog content. A central web page or website for a topic is not the only source of information on that issue, and blogs present opinions and links to other websites that provide novel ideas.

Entity data miner—An entity data miner identifies web pages which contain predefined entities (persons, places, etc.).

Key outlink data miner. A key outlink data miner biases towards web pages that link to a set of predefined URLs that consumers find interesting. This reflects the concept of forward link-count web crawling.

Locale data miner. A locale data miner biases towards web pages whose top-level domain names originate from a location of interest to the client or user. This type of data miner also examines a language of the web page, and scores a page up or down appropriately.

Table 1 illustrates an example typical weights assigned to web pages by the various data miners described above.

TABLE 1

| Data Miner Type | Miner Weights |
|---|---|
| Content type | 50 |
| Blog | 100 |
| Locale | 200 |
| Entity | 325 |
| Key Outlink | 325 |
| Bad URL | −100 |
| Adult Content | −425 |
| Spam | −425 |

Each web page passed through the data miners is scored multiple times and the multiple scores are aggregated into a final web page score for each of the web pages. For example, a single web page may receive a weight of 1 for each miner. This weight is multiplied by the miner weights illustrated in table 1. The web page scores may be combined using any technique. In this example the combined scores produce a final web page score of 50 indicating a slightly higher than neutral final web page score for one of the sample web pages. This process is repeated for all of the sample web pages to produce a plurality of final web page scores for the website. Table 2 illustrates final web page scores for each sample web page from a website to be scored.

TABLE 2

| Sample Web Page | Final Web Page Score |
|---|---|
| Web Page 1 | 50 |
| Web Page 2 | 50 |
| Web Page 3 | 500 |
| Web Page 4 | 700 |
| Web Page 5 | 325 |
| Web Page 6 | −200 |
| Web Page 7 | −500 |
| Web Page 8 | −200 |

A single website score is generated from all of the final web pages scores illustrated in table 2. The final web pages scores may be combined, averaged, etc. For example, final web pages scores may be averaged to produce a website score of 90.625 indicating a good website score for the website. This process is repeated for multiple websites to produce a plurality of website scores. The website scores are ranked (i.e., by the offline analysis software application) with respect to each other in order to determine a list of ranked websites for a user. Table 3 illustrates website ranking list.

TABLE 3

| Ranked Websites | Website Score |
|---|---|
| Website 1 | 925 |
| Website 2 | 400 |
| Website 3 | 225 |
| Website 4 | 100 |
| Website 5 | 50 |
| Website 6 | −100 |

TABLE 3-continued

| Ranked Websites | Website Score |
|---|---|
| Website 7 | −500 |
| Website 8 | −600 |

Figure 3:
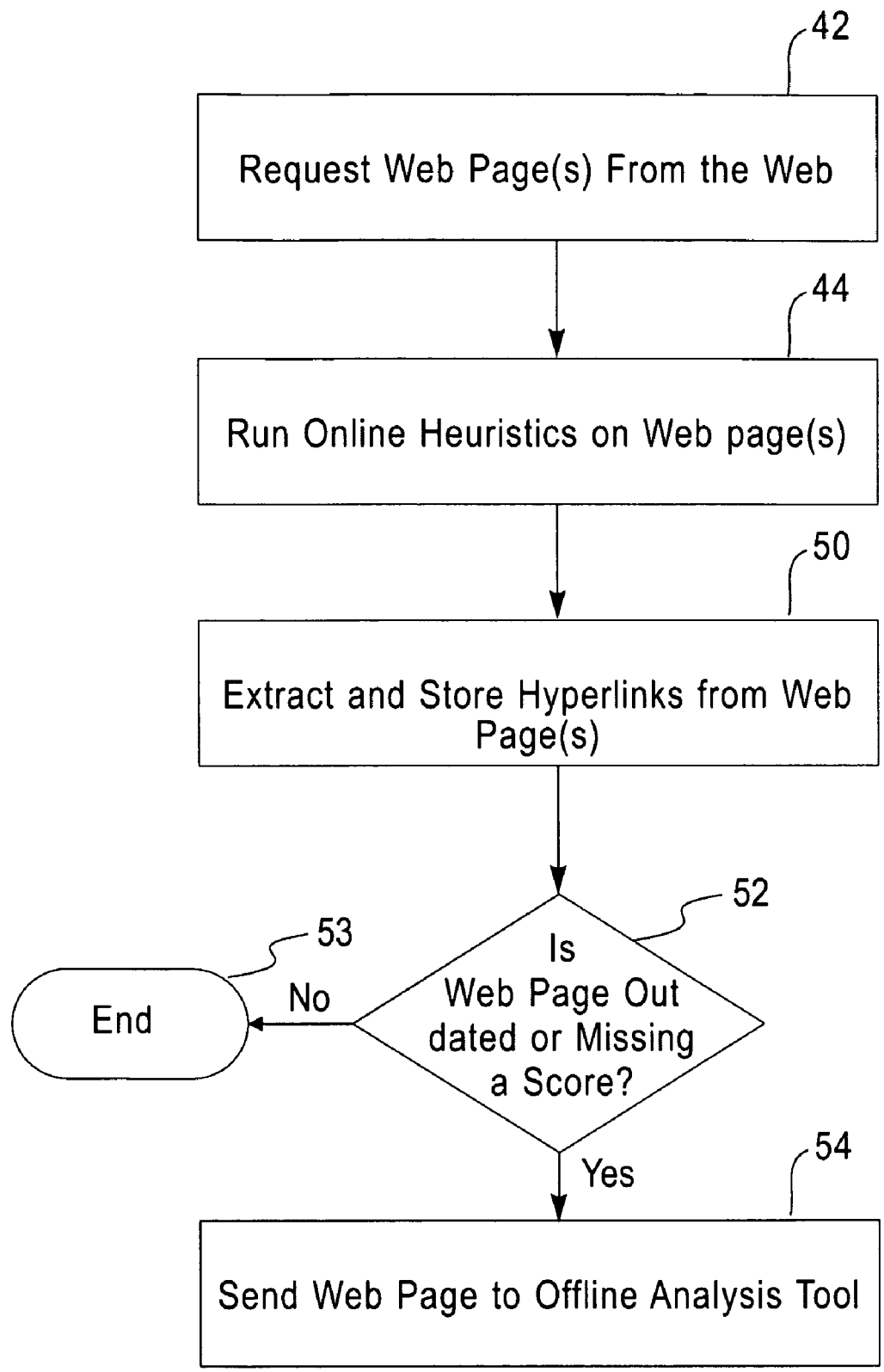
FIG. 3 is a flowchart describing an algorithm for implementing the web crawler system of FIGS. 1 and 2, in accordance with embodiments of the present invention.

FIG. 3 is a flowchart describing an algorithm for implementing the web crawler system 2 of FIGS. 1 and 2, in accordance with embodiments of the present invention. In step 42, the web crawler requests a web page(s) from a website on the web. Content for the requested web page(s) is returned. In step 44, the online analysis software application 17 performs online heuristics on the web page(s). In step 50, the online analysis software application extracts hyperlinks from the web page(s) and stores the hyperlinks in the URL database 8c for subsequent crawls. In step 52, the online analysis software application 17 queries the website score database 20 to determine if there is a current entry (i.e., a website score) for the website that the web page(s) is comprised by. If in step 52, it is determined that the website that the web page(s) is comprised by is unknown (i.e., does not comprise a website score) or has an outdated website score, then in step 54 the web page(s) is sent to the offline analysis software application 22 for further evaluation and/or scoring. If in step 52, it is determined that the website that the web page(s) is comprised by comprises a valid score then the process ends in step 53.

Figure 4:
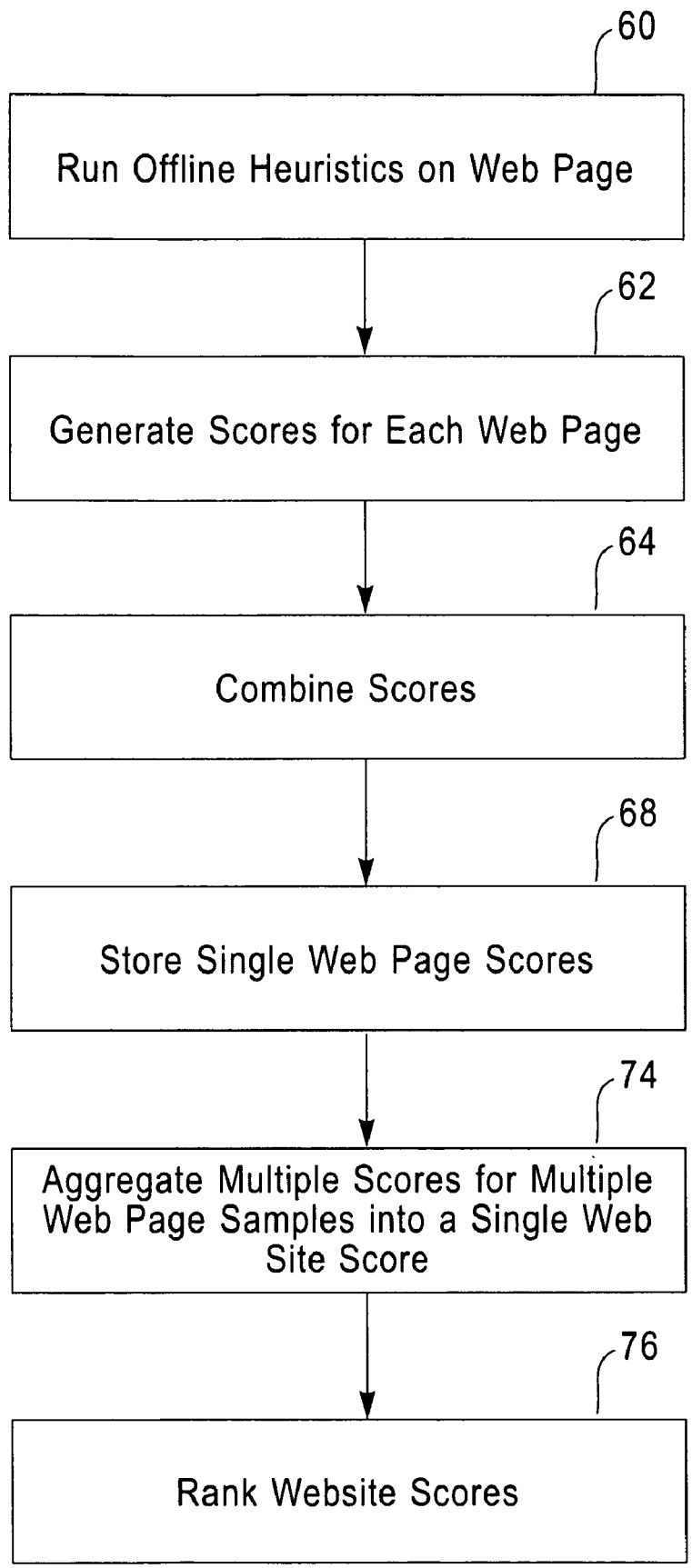
FIG. 4 is a flowchart illustrating embedded functions further detailing step of FIG. 3, in accordance with embodiments of the present invention.

FIG. 4 is a flowchart illustrating embedded functions further detailing step 54 (i.e., offline analysis software application evaluation) of FIG. 3, in accordance with embodiments of the present invention. In step 60, the offline analysis software application 22 analyzes the web page(s) with several offline heuristics. In step 62, final scores are generated for each web page. In step 64, the offline analysis software application 22 combines the scores for each web page into a single score for each web page. In step 68, the single web page scores are stored in the temporary web page score database 27. In step 74, the single web page scores for each of the web pages are aggregated into a single website score for the website. In step 76, the website score is ranked against other website scores to generate a website ranking list.

Figure 5:
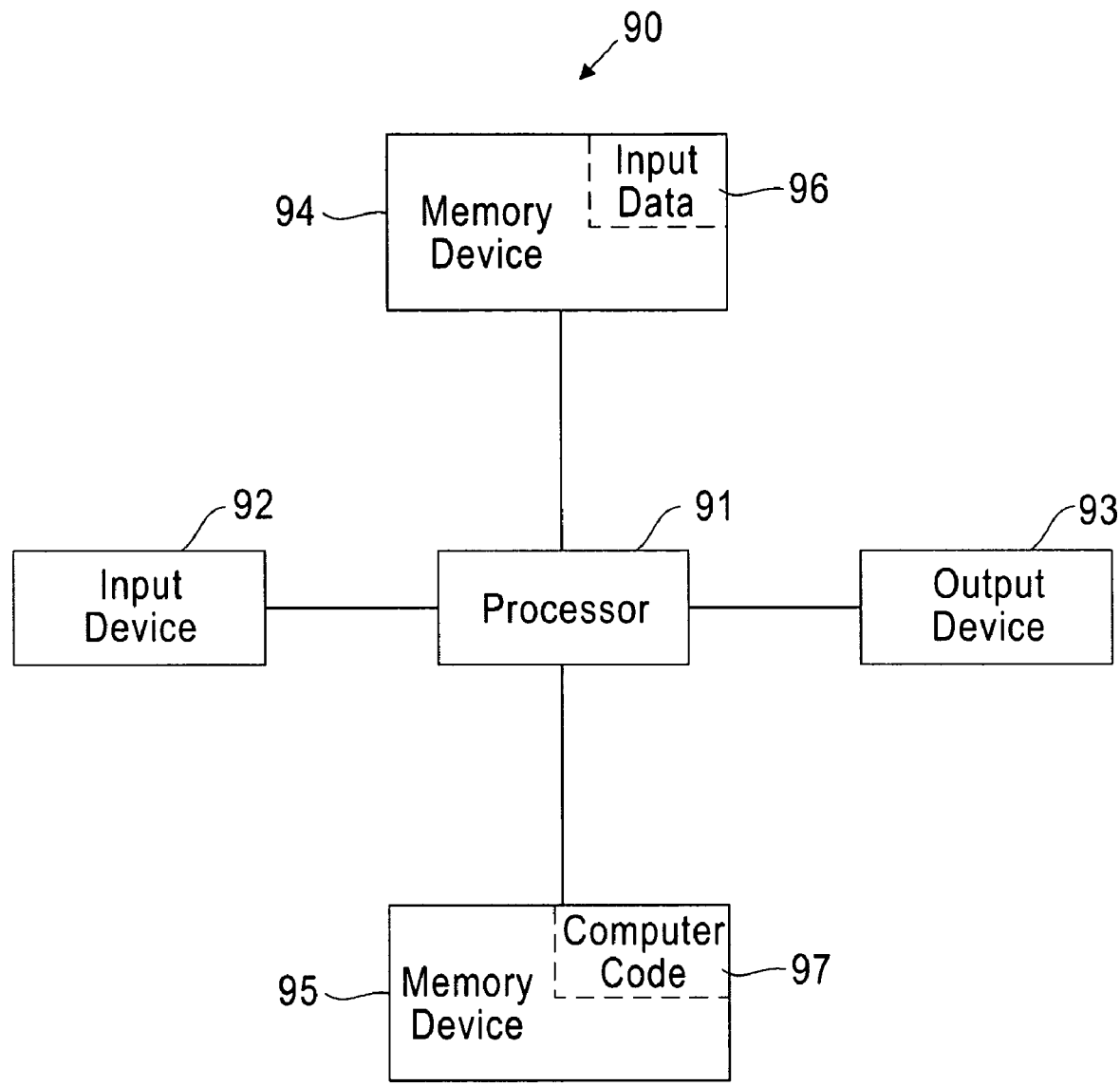
FIG. 5 illustrates a computer system for prioritizing websites during a web crawling process, in accordance with embodiments of the present invention.

FIG. 5 illustrates a computer system 90 (i.e., computing system 5 of FIGS. 1 and 2) for prioritizing websites during a web crawling process, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm used for prioritizing websites during a web crawling process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to prioritize websites during a web crawling process. Thus the present invention discloses a process for deploying or integrating computing infrastructure, comprising integrating computer-readable code into the computer system 90, wherein the code in combination with the computer system 90 is capable of performing a method for prioritizing websites during a web crawling process. In another embodiment, the invention provides a business method that performs the process steps of the invention on a subscription, advertising, and/or fee basis. That is, a service provider, such as a Solution Integrator, could offer to generate and rank website scores. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A prioritization method, comprising:

extracting, by a web crawler in a computing system, a set of candidate web pages to be crawled, wherein said computing system comprises a memory unit, and wherein said memory unit comprises said web crawler, said set of candidate web pages, an online analysis software application, an offline analysis software application, a web page score database, and a website score database;

simultaneously executing, by said computing system, said online analysis software application and said offline analysis software application in order to simultaneously perform an online analysis and an offline analysis:

associating, by said online analysis software application, each web page in said set of candidate web pages with a website in a computer network;

determining online, by said online analysis software application that a first website score for said website is not available in said website score database;

requesting, by said web crawler, a first sample set of web pages from said website, wherein said first sample set of web pages does not include a total set of web pages from said website;

first analyzing offline, by said offline analysis software application, each sample web page of said first sample set of web pages with a plurality of offline heuristics;

generating, by said offline analysis software application, a first group of web page scores for each said sample web page of said first sample set of web pages based on results of said first analyzing offline;

storing, each said first group of web page scores in said web page score database;

determining, by said offline analysis software application, that a number of Web pages in said first sample set of web pages has reached a predetermined threshold;

generating, by said offline analysis software application in response to said determining, that said number of Web pages in said first sample set of web pages has reached said predetermined threshold, a first final web page score for each said web page of said first sample set of web pages, wherein each said first final web page score is generated by combining each web page score within each said first group of web page scores;

storing, each said first final web page score in said web page score database;

generating, by said offline analysis software application in response to said determining online, a first website score for said website, wherein said first website score is generated by combining said first final web page scores for said first sample set of web pages;

storing, said first website score in said website score database;

associating, by said online analysis software application, said first website score for said website with associated web pages in said set of candidate web pages;

prioritizing, said set of candidate web pages with respect to a first associated website score for each web page in said candidate set of web pages;

retrieving, by said web crawler, first content from said candidate web pages using said prioritizing;

extracting, by said online analysis software application, first hyperlinks from said first content;

storing said first hyperlinks in said memory unit;

determining by said online analysis software application that a specified time period has elapsed since said generating said first website score;

requesting, by said web crawler, a second sample set of web pages from said website, wherein said second sample set of web pages does not include a total set of web pages from said website, and wherein said second sample set differs from said first sample set;

second analyzing offline, by said offline analysis software application, each sample web page of said second sample set of web pages with said plurality of offline heuristics;

generating, by said offline analysis software application, a second group of web page scores for each said sample web page of said second sample set of web pages based on results of said second analyzing offline;

storing, each said second group of web page scores in said web page score database;

generating, by said offline analysis software application, a second final web page score for each said web page of said second sample set of web pages, wherein each said second final web page score is generated by combining each web page score within each said second group of web page scores;

storing, each said second final web page score in said web page score database;

generating, by said offline analysis software application, a second website score for said website, wherein said second website score is generated by combining said second final web page scores for said second sample set of web pages;

generating, by said online analysis software application, data specifying a date associated with said generating said second website score;

storing, said second website score and said data in said website score database;

associating, by said online analysis software application, said second website score for said website with said associated web pages in said set of candidate web pages;

second prioritizing, said set of candidate web pages with respect to a second associated website score for each web page in said candidate set of web pages;

retrieving, by said web crawler, second content from said candidate web pages using said second prioritizing;

extracting, by said online analysis software application, second hyperlinks from said second content; and storing said second hyperlinks in said memory unit.

2. The method of claim 1, wherein said offline analysis software application comprises a plurality of data mining software tools.

3. The method of claim 1, wherein said analyzing offline comprises performing a search for specified expressions within said content from each said sample web page of said first sample set of web pages, wherein each specified expression from said specified expressions is selected from the group consisting of a phrase and a word, and wherein said specified expressions are divided into a first group of expressions that are of positive interest to a user of said web crawler and a second group of expressions that are of negative interest to said user.

4. The method of claim 3, wherein said analyzing offline further comprises determining if each said sample web page of said first sample set of web pages comprises a hyperlink to an alternative web page comprising an expression from said first group or said second group.

5. The method of claim 1 wherein said requesting comprises a dynamic determination of a sample size of said sample set of web pages.

6. The method of claim 1 further comprising:

excluding, by s/rid online analysis software application, a group of web pages from said first sample set of web pages based upon a plurality of heuristics.

7. The method of claim 1, wherein said plurality of offline heuristics consists of determining that each said sample Web page of said first sample set of web pages links to a PDF file.

* * * * *